May 26, 1959 C. J. YOUNG 2,888,672

CODE TRANSLATOR

Original Filed March 1, 1951 4 Sheets-Sheet 1

INVENTOR.
CHARLES J. YOUNG

BY

ATTORNEY

INVENTOR.
CHARLES J. YOUNG
BY
George J. Craig
ATTORNEY

INVENTOR.
CHARLES J. YOUNG
BY
George T. Craig
ATTORNEY

May 26, 1959 C. J. YOUNG 2,888,672

CODE TRANSLATOR

Original Filed March 1, 1951 4 Sheets-Sheet 4

INVENTOR.
CHARLES J. YOUNG
BY
George T. Craig
ATTORNEY

United States Patent Office 2,888,672

Patented May 26, 1959

2,888,672

CODE TRANSLATOR

Charles J. Young, Princeton, N.J., assignor to Radio Corporation of America, a corporation of Delaware Original application March 1, 1951, Serial No. 213,318, now Patent No. 2,759,045, dated August 14, 1956. Divided and this application July 3, 1956, Serial No. 595,760

7 Claims. (Cl. 340—347)

The present invention relates to the transmission of character code signals and to the selection of indicia, including readable characters, by code controlled means; and, more particularly, but not necessarily exclusively, to novel means for translating code signals. This invention is a division of my copending application Serial No. 213,318, which was filed on March 1, 1951, now Patent No. 2,759,045, granted August 14, 1956.

In the setting of the present invention, character code signals are derived and transmitted by multiplex methods to a receiving point where an arrangement is provided for selecting and electronically producing a letter of the alphabet, for example, and for locating the selected letter in an orderly arrangement of similarly selected letters. This orderly arrangement of letters may be recorded by photographic means, for example, or by other means. Suitable recording mediums may be employed which are sensitive to visible or invisible radiant energy. Radiation controlled electrostatic patterns may be employed for recording. Any suitable kind of code presenting medium may be used with the invention including transparent tape marked with code characters, punched tape or magnetic tape.

In accordance with the present invention, a novel arrangement is provided for converting coded information into selection signals for performing a selecting function or functions. In the illustrative embodiment, an equal unit code, a five unit code for example, is converted to weighted deflection values.

The primary object of the invention is to provide, in a novel way, for the transmission of coded signals representing letters and figures, and for selection and arrangement of the letters and figures in intelligible form in accordance with the transmitted signals, or either.

A further object is to provide novel means for the electronic selection and/or arrangement of indicia by code controlled means.

Other objects and advantages of the invention will, of course, become apparent and immediately suggest themselves to those skilled in the art to which the invention is directed from a reading of the following specification in connection with the accompanying drawings in which.

Figure 1:
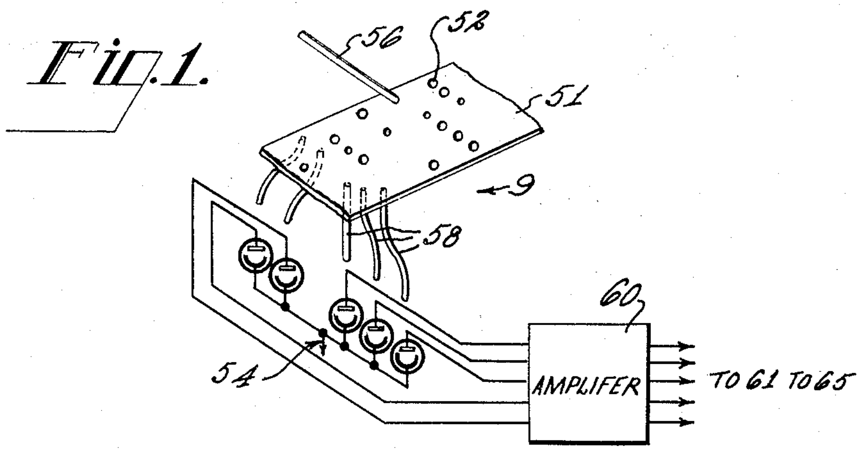
Figure 1 is a schematic showing of an arrangement suitable for deriving code signals representing letters of the alphabet or other indicia.
Figure 2:
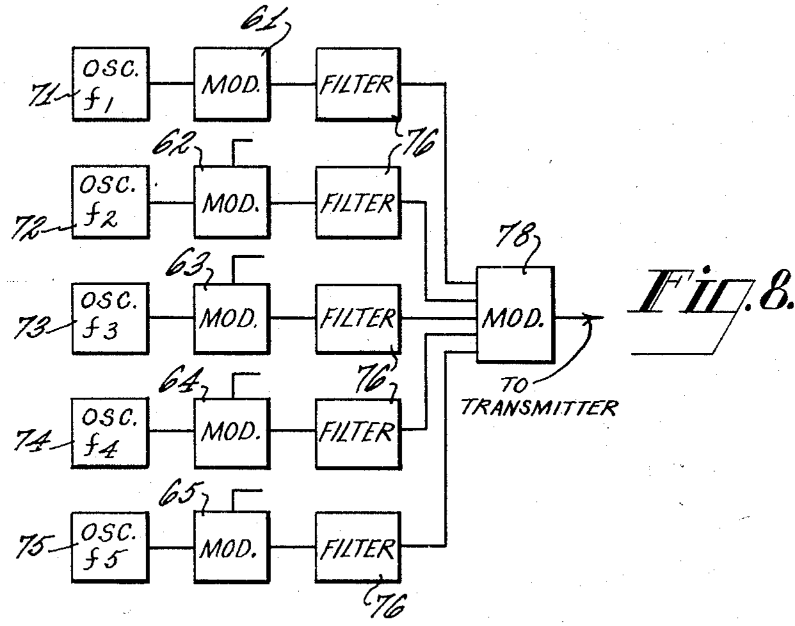
Fig. 2 is a schematic showing of transmitting apparatus suitable for simultaneously transmitting sets of code signals, each set representing a character.

Fig. 1 of the drawing shows, schematically, one form of transmitter 9 which is capable of producing coded signals at high speed for operating the receiving apparatus shown schematically in Fig. 2 of the drawing. The transmitter of Fig. 1 may, if desired, include features shown in Zworykin Patent No. 1,753,961 granted April 8, 1930. A patent to Cremer No. 1,828,556 dated Oct. 20, 1931 also discloses a code transmitter suitable for purposes of carrying out this invention. The fragment of a strip of tape bears code characters representing the letters "YR."

Figure 3:
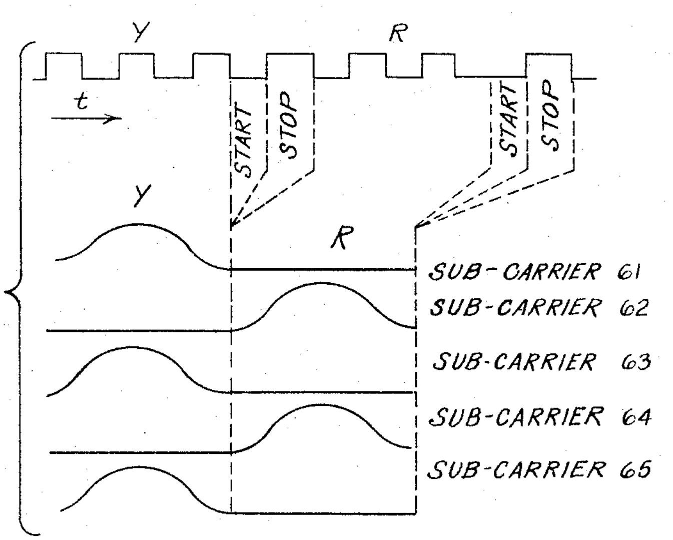
Fig. 3 shows a series of waveforms illustrating the manner in which signals are derived at the receiver.
Figures 4, 5, 9:
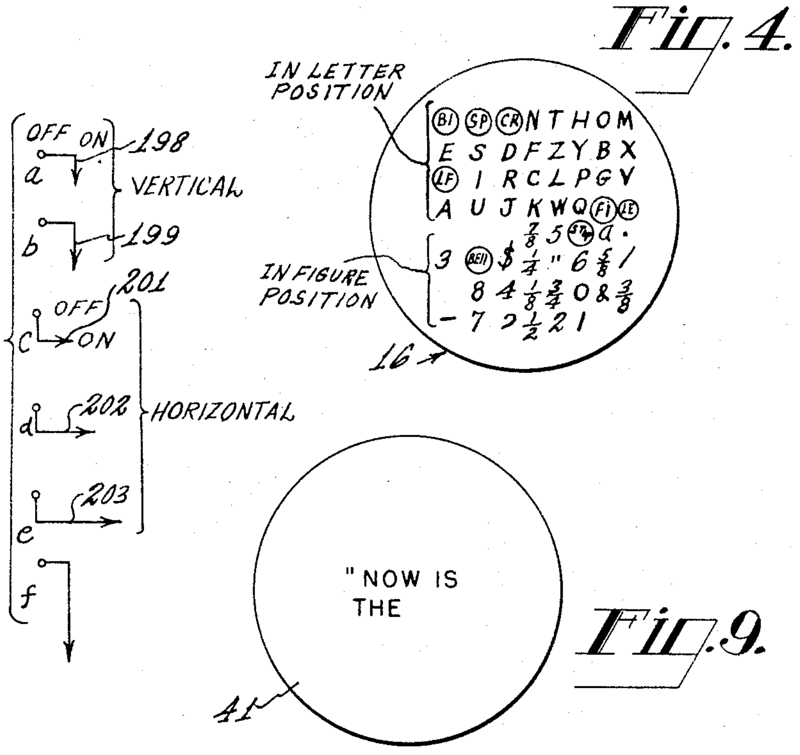
Fig. 4 is a view of the character defining means of the invention which presents characters disposed for selection.
Fig. 5 is a diagrammatic showing of the manner of providing character selection by deflection of an electron stream.
Fig. 9 is a view similar to Fig. 4 illustrating selected characters placed in an orderly arrangement on one face of the cathode ray tube shown by way of example.
Figure 6:
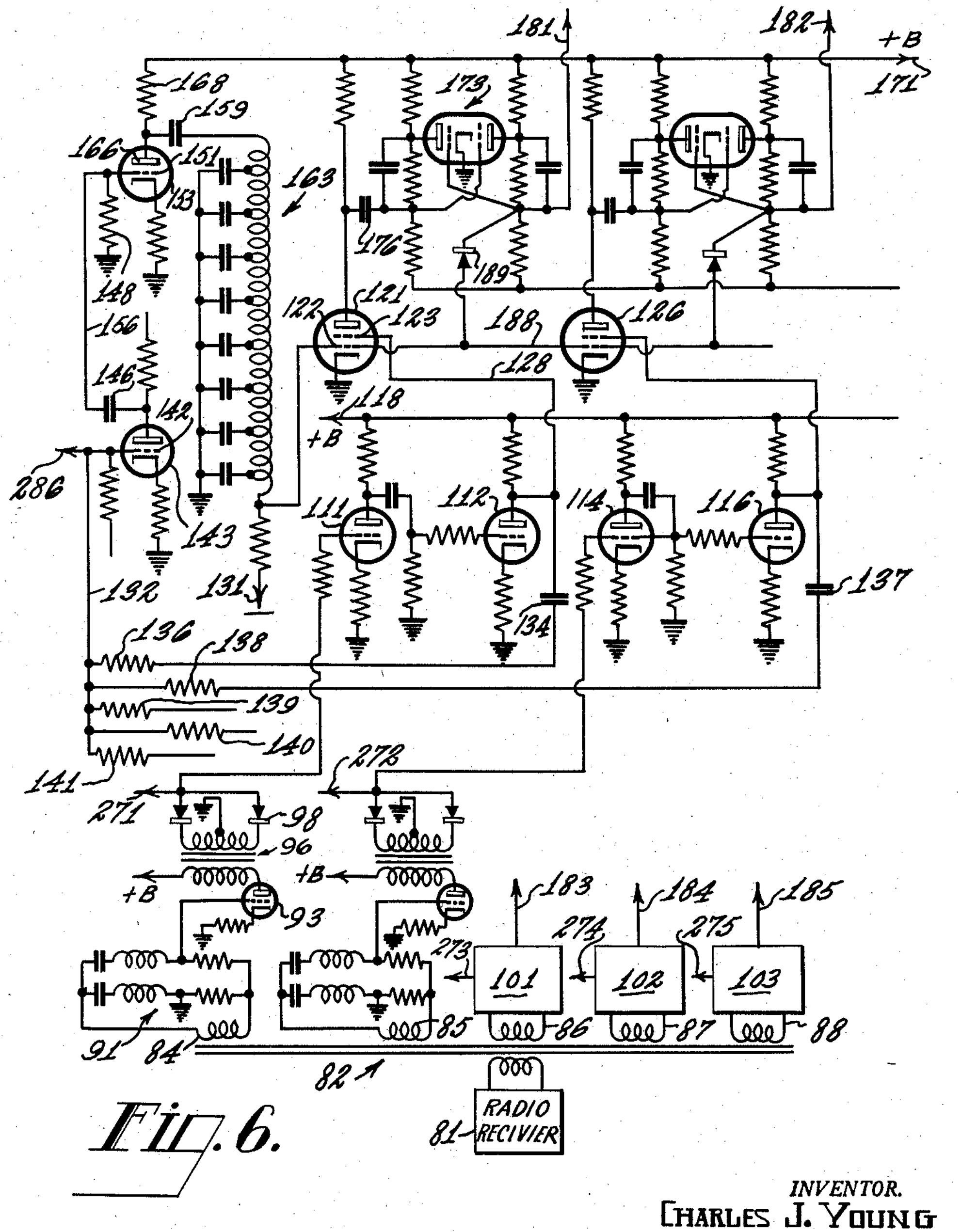
Fig. 6 is a schematic showing of the selecting apparatus in accordance with the invention.
Figure 7:
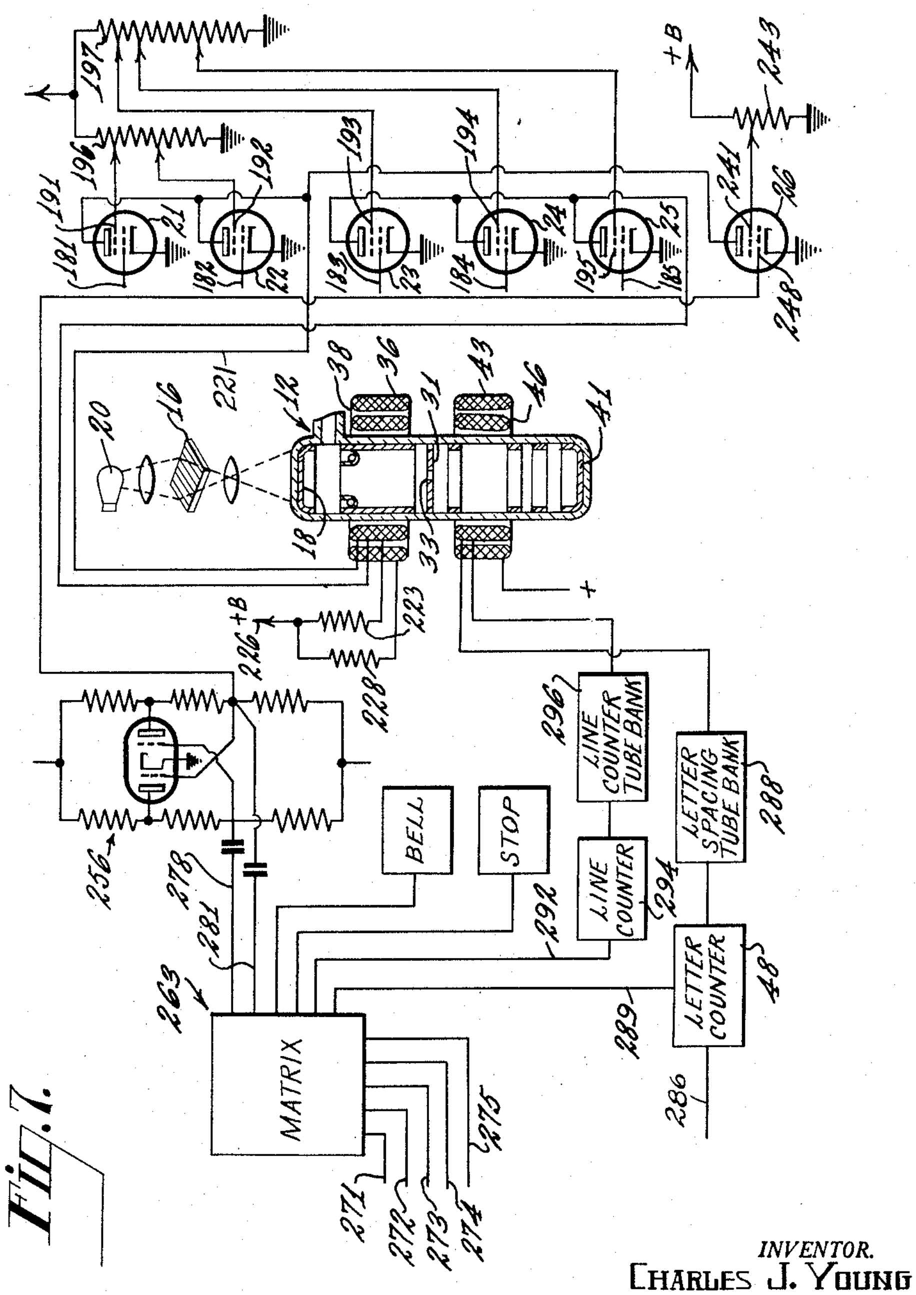
Fig. 7 is a schematic showing of apparatus for arranging selected characters in order and performing other functions.

The receiving and recording arrangement of Figs. 6 and 7 includes a special tube designated in its entirety by reference character 12. The tube 12 will be described more in detail hereinafter. A slide or mask 16, Figs. 4 and 7, is interposed between the photocathode 18 of the tube 12 and a light source 20 (Fig. 7). The slide 16 may, if desired, be in the form of a mask applied directly to the face of the tube 12. The indicia may be opaque or transparent on an opaque field. Fig. 4 of the drawing shows the slide or mask 16 somewhat in detail. It is effectively divided into squares which correspond to components of deflection superimposed on the cathode ray stream deflection means of one section of the tube 12. For example, the square inscribed with the letter "Y" is reached by deflecting the beam one unit vertically and five units horizontally from the upper left-hand or "rest" position. This operation is indicated by Figs. 3, 4, and 5. Weighted values of the five units of the code, used illustratively for purposes of description, provide cumulative deflection on a binary basis as shown by Fig. 5. In Fig. 4, the circled locations correspond to special combinations to be selected to control functions of the apparatus. No activation of the screen in the tube 12 occurs upon arrival of these special combinations because the circled areas are blank on the slide 16. In the illustrative arrangement, these functions, using usual terms, are shift, unshift, bell, stop, line advance, space, and carriage return. The upper four rows of Fig. 4 are selected when the apparatus operates in the "letter" position. The lower rows, rows five to eight, are selected as shown by Fig. 5.

The photocathode 18 is semi-transparent in the preferred form of the tube 12. The deflection control comprising tubes 21 to 25 and an additional tube 26, which is set up in the code converting arrangement of Fig. 7 for selecting the desired character, sweeps the electron image stream emitted from the photocathode 18 across a barrier until only the image of the chosen character falls on an aperture 33. The electron image from the photocathode is focussed by a focussing coil 36 and deflection is provided by a yoke shown conventionally at 38. The image of the selected character passing through the aperture 33 is refocussed on a fluorescent screen 41 with the aid of a focussing coil 43. Deflection currents supplied to a deflecting yoke unit 46 under control of the letter advance counter unit 48 place the luminous image of the selected character in the desired position on the screen laterally of the character line. As indicated on Fig. 7, the tube 12 is provided with a plurality of focussing and accelerating electrodes shown illustratively in the form of rings.

As stated above, the apparatus of Figs. 6 and 7 is controlled by received code pulses. Referring to Fig. 1, there is shown a fragment of tape 51 from a message bearing strip. The tape 51 may be transparent and code marks 52 thereon may be opaque. Fig. 1 of the drawings shows a tape transmitter or reader having a tape 51 with code marks in the form of punchings therein. A magnetically recorded tape could be used with lines or areas of magnetic recording serving as code marks. In accordance with the embodiment of the invention shown herein, the five unit Baudot code is used. There are five positions spaced laterally of the tape which may be occuplied by punched holes 52. The code combination for "Y" is in position to be read by three phototubes in the five tube phototube bank 54. A suitable lamp 56 projects light through light guides 58 of quartz or "Lucite" onto the phototubes. Lenses or other optical means may be employed to direct light from the lamp 56 through a given hole 52 onto the corresponding phototube. The anode or output circuits of the phototubes are connected through an amplifier 60 having separate amplifying paths to modulators 61 to 65 (Fig. 2). In the illustrative arrangement, oscillators 71 to 75 feed the modulators 61 to 65 and a bank 76 of filters maintains channel separation. The filtered outputs are fed to a modulator 78 and to a radio transmitter (not shown). It will be understood that 78 may be omitted if a voice communication channel is used. The five code signals, one for each code unit, are thus simultaneously multiplexed for transmission. Fig. 3 shows the character of the received demodulated signal.

In Fig. 6, signals are received from the apparatus of Fig. 2 by a suitable receiver 81. The demodulated output of the receiver 81 is fed to a transformer 82 having five, for example, secondaries, 84 to 88. The secondary 84 feeds a channel selector filter 91 which may correspond to the filter following the modulator 61 at the transmitter so as to select the signal initiated by the first code mark 52 on the tape. If a code mark is present, this will be a marking signal for subcarrier 61 which is demodulated as shown by Fig. 3. It will be understood that a code mark may represent a "spacing" condition or signal. The output of the channel filter 91 is applied to an amplifier 93 which feeds a transformer 96 and a full wave detector 98.

Fig. 6 of the drawing shows the complete circuits for channels fed by secondaries 84 and 85 to the deflection tubes 21 and 22 in Fig. 7. Similar circuitry for the channels fed by the secondaries 86, 87, and 88 is indicated in block diagram form by the blocks 101 to 103. Fig. 6 includes a showing of the circuitry for providing limiting, sampling the pulse at its center point, and a simultaneous rise and fall of all deflection currents from the tubes 21 to 25.

In Fig. 6, it will be noted that the channels, shown illustratively as originating at the transformer secondaries 84 to 88, carry signals derived as indicated in Fig. 3 of the drawing. For example, when the letter "Y" is being transmitted, the first channel will carry a pulse as indicated for channel 61 in Fig. 3 and which gives on lead 271, after rectification, the curve *a* of Fig. 8. The second sub-channel of Fig. 8 in the assumed example labelled subcarrier 62 of Fig. 3 will be in the spacing condition. For the first channel of the decoder of Fig. 6, tubes 111 and 112 form a limiter which squares up the pulse signal as shown by curve *b* of Fig. 8. Limiters and their connections are by now well known and the tubes 111 and 112 as well as the limiter tubes for the other four channels are connected in any suitable manner to provide limiting. Limiter tubes 114 and 116 are shown for the channel associated with the transformer secondary 85. Reference character 118 indicates the connection for the limiter tubes to a suitable source of positive plate supply voltage for these tubes. The remaining channels are also provided with limiter tubes, the connections of which are not shown for the sake of convenience of illustration.

A tube 121 having at least two grids 122 and 123 serves as a control tube. A tube 126 having a similar function is shown for the second receiver channel. The remaining channels are provided with similar tubes not shown in detail. The No. 2 grid or screen grid 123 of the tube 121 is connected by a lead 128 to the output of the second stage tube 112 of the two-tube limiter. The grid 123 of the tube 121 is positive during the pulse as illustrated by curve *b* of Fig. 8. The grid 122 is connected to a suitable source of negative biasing voltage as indicated at 131, the negative bias being sufficient to hold the tube 121 at cut-off.

The limiter stages in the five channels are connected to a conductor 132 whereby a pulse for each character is always present in the conductor 132. Considering the limiter tube 112, its anode is connected by way of a condenser 134 and a high resistance 136 to the conductor 132. A similar condenser 137 and resistor 138 is provided for the output of the limiter tube 116. The remaining connections are indicated schematically and include resistors 139, 140 and 141 as well as condensers (not shown) corresponding to the condensers 134 and 137. The high resistors connected to the conductor 132 are equal in value.

The lead 132 is connected to the grid 142 of a tube 143. If any one or more of the connections to the conductor 132 carries the pulse, then the cathode to grid path of the tube 143 is conductive and holds the grid at essentially cathode or ground potential. This provides a means for obtaining a signal at the grid 142 for each character selection operation. The tube 143 functions as an amplifier followed by a differentiating circuit composed of a condenser 146 and a resistor 148. The resistor 148 serves as a grid resistor for the grid 151 of a tube 153.

Figure 8:
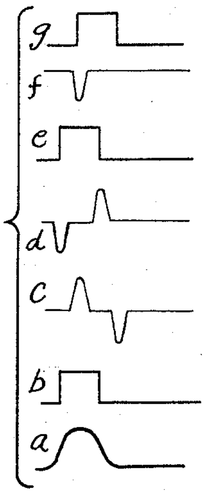
Fig. 8 shows a series of waveforms used in explaining the operation of the apparatus of Fig. 6.

The conductor 156 applies sharp positive and negative pulses to the grid 151 as shown by curve *d* of Fig. 8. At the plate of the tube 153, these pulses are inverted and applied through a coupling condenser 159 to a phase delay network of any suitable kind, for example, the delay line 163. The plate 166 of the tube 153 is connected in the usual manner through a load resistor 168 to a suitable source of positive plate supply voltage (not shown) as indicated schematically by reference character 171.

The pulses represented by the curve *d* of Fig. 8, after passing through the delay line 163, are delayed as shown by the curve *c* of Fig. 8. The positive pulse now comes substantially in the center of the signal pulse represented by the curve *b* of Fig. 8. The previously mentioned tube 121 is held at cutoff by the bias applied at 131 and prepared for the passage of a pulse by application of the limited signal to the grid 123. The positive going portion of the pulse of curve *c* of Fig. 8 is passed by the tube 121.

Reference character 173 designates a multivibrator of the locking type. Multivibrators similar to the multivibrator 173 are discussed in an article entitled "Electronic Digital Counters" by Warren H. Bliss appearing in the April 1949 issue of Electrical Engineering. The positive-going pulse of the waveform *c* of Fig. 8 is inverted in phase by the tube 121 and is applied as a negative pulse through a condenser 176 to the grid of the right-hand tube section of the multivibrator 173. This tube is cut off and the voltage in a conductor 181 rises as shown by the waveform *g* in Fig. 8. Each channel of the arrangement shown in Fig. 8 has a conductor corresponding to the conductor 181 and these are labelled 182 to 185 respectively. The conductor 181 is connected to the grid of the tube 21 (Fig. 7). The remaining conductors 182 to 185 are connected to the grids of the tubes 22 to 25 respectively to produce deflection of the cathode ray stream from the photocathode 18 of the tube 12.

The conductor 181 stays positive until the multivibrator 173 is restored to its original state when the negative peak of the curve *c* of Fig. 8 is supplied from a conductor 188 through a rectifier 189 to the right hand tube section of the multivibrator 173. It will be seen that the current in the remaining tubes 22 to 25 are either left at zero or turned on and off simultaneously with the current in the tube 21. In the illustrative example, the second electrodes or screen grids 191 to 195 of the tubes 21 to 25 are connected to taps on multiple slider potentiometers 196 and 197. Voltage settings are arranged by the sliders on the potentiometer 196 so that when the deflection tubes 21 and 22 are conductive their screens are held to values which make the plate current have a ratio of 1 to 2 to provide the deflection components set upon a binary scale as indicated by the length of the arrows 198 and 199 of Fig. 5 of the drawing. The sliders of the potentiometer 197, connected to the second grids 193, 194 and 195 of the tubes 23, 24 and 25 respectively, are set so that when these tubes are conductive their screens are held to values which make the plate current have a ratio of 1–2–4 as shown by the arrows 201, 202, and 203 in Fig. 5 of the drawing. The arrows thus represent coordinates of direction of deflection which combine to give a desired resultant direction to effect selection. The plate currents of the tubes 21 and 22 combine in the vertical deflection coil of the yoke 38 to provide the vertical deflection component necessary for selection of a character. In the illustrative example as shown by Fig. 3, for the character "Y," the tube 21 is conductive and the tube 22 is nonconductive.

The arrangement of apparatus disclosed by Fig. 6 of the drawing performs the desirable function of maintaining the direction of the electron stream from the photocathode such that the blank position represented by the upper left hand corner of Fig. 4 registers with the aperture 33 until the selected tubes 21 to 25 are simultaneously turned on. The electron stream then moves instantly to the selected letter, stays there for a definite length of time during exposure, and then returns directly to its starting position. This condition will be obtained because of the effect of the limiters and timing or synchronizing system, even if the signal pulses are somewhat mutilated.

Fig. 7 of the drawing includes apparatus which is shown illustratively and schematically for obtaining deflection of the electron stream representing the selected character which passes through the aperture 33 in the barrier 31 of the tube 12. The previously mentioned yoke 46 is provided with two coils, one of which directs the electron stream in, for example, the horizontal direction to provide for character spacing along a single line. The second coil provides deflection, for example, in a vertical direction to space the lines of selected characters. By this arrangement, the characters appearing as luminous images on the fluorescent screen 41 may be recorded in successive lines corresponding to the arrangement of the record produced by a simplex teleprinter operated by the usual keyboard transmitter or tape transmitter employing tape indicated at reference character 51. The plates of the tubes 21 and 22 are connected over a conductor 221 to one of the coils in the yoke 38. In the illustrative example, this is the coil which selects the row of characters on the mask 16. The remaining end of this coil is connected through a resistor 223 to a source of positive voltage as indicated at reference character 226. The voltage at this point may, for example, be in the neighborhood of 250 volts which is the usual plate voltage for suitable tubes used for deflection purposes with the illustrative arrangement of Fig. 7. Location of the electron stream so that the rest position of the mask is selected may be accomplished by auxiliary deflection coils (not shown) in the yoke 38. An additional auxiliary coil (not shown) in quadrature with the first named auxiliary coil may be used to obtain the other component of initial positioning for obtaining the rest position of the electron stream. The plates of the tubes 23, 24 and 25 are connected through the horizontal coil in the yoke 38 and through a resistor 228 to the connection 226.

Characters are selected from the upper or lower section of the mask 16 by means of the tube 26, the plate of which is connected to the plates of the tubes 21 and 22. The screen grid 241 of the tube 26 is connected to a potentiometer 243 similar in function to the potentiometers 196 and 197. The first grid 248 of this tube is connected to one side of a multivibrator 256. If it is assumed that the right hand section of the multivibrator 256 is conductive, then the voltage applied to the grid 248 will be relatively low and the upper portion of the mask will be selected. When the multivibrator state is reversed and the right hand tube section is off, then the grid 248 will be at a relatively high potential and the tube 26 will conduct adding the necessary component of vertical deflection to select the lower part of the mask 16. The multivibrator 256 is or may be similar to the multivibrator 173 previously described.

The multivibrator 256 as well as other apparatus to be described operates under control of a selector matrix. Selector matrices are fully disclosed in U.S. Patent No. 2,428,811 granted to J. A. Rajchman on October 14, 1947. Fig. 4 of that patent discloses a matrix having three inputs and eight outputs. In matrices of this type, the number of outputs is equal to $2^n$ where $n$ equals the number of inputs. An example of a matrix is shown in Fig. 5 of the patent just referred to in which there are six inputs and sixty-four outputs. For purposes of the present invention, the matrix shown schematically in block form and designated by reference character 263 has five inputs corresponding to each element of the code selected illustratively for purposes of description of an embodiment of the present invention. Such a matrix can have thirty-two outputs. However, several functions have been selected for purposes of illustrating the capabilities of apparatus embodying this invention beyond the character selection function. It will be understood that the input to the matrix may be similar to that shown in Fig. 4 of the Rajchman patent wherein positioning of the switches 221 to 226 of that figure are discussed. In the arrangement chosen for illustrating operation of the present invention, the five inputs are derived from the leads 271 to 275 and carry pulses representing elements of the code. These leads 271 to 275 may operate switches, magnetic relays or multivibrators in a manner similar to that described for operation of the switches 221, 222, and 223 of Rajchman patent.

One of the outputs of the matrix 263, designated 278, operates the multivibrator 256 when the code representation for a "shift" or "figures" is received. The signal provided by the lead 278 causes the grid 248 of the tube 26 to reach its higher positive potential. A signal received from the matrix 263 over a connection 281 in response to the code character for "letters" or "unshift" causes the grid 248 to assume its more negative value.

Spacing of the selected letters in a row by the yoke 46 of the tube 12 is accomplished in the illustrative example by providing the electronic counter 48 of the kind fully described in the Bliss publication referred to above which counts pulses received over a lead 286. The output of this counter, which counts in accordance with the binary system of notation, is applied to a tube bank 288 which is or may be similar to the tube bank comprising the tubes 21 to 25 described above. The output from the tube bank 288 is applied to the horizontal deflection coil in the yoke 46 in the manner similar to the application of the outputs of the tubes 23 to 25 to the horizontal deflection coil in the yoke 28. The counter 48 is reset over the connection 289 in response to receipt of the code signal representing "carriage return."

In order to obtain arrangement of the selected characters in a plurality of lines, the matrix 263 provides a connection 292 in which a signal appears in response to the code signal representing the "line advance." A counter 294 which is of the self-resetting type, receives the signal from the lead 292. The output of this counter is applied to a tube bank 296 similar to the tube bank 288 and the output of this tube bank is applied to the vertical deflection coil in the yoke 46. It will be understood that the counter 294 may be made responsive to an "end of message signal" of any desired kind, the "stop" signal for example, so that the counter may be reset at any time.

What is claimed is:

1. A code translator or converter comprising a single bank of multivibrators, each multivibrator having an initial state of conduction, a multigrid tube associated with each multivibrator, means whereby each multivibrator biases its associated multigrid tube to cutoff, a code unit channel for each multivibrator to supply code unit information simultaneously to said multivibrators, means to bias one of the grids of each of said multigrid tubes by voltages such that the plate currents of these tubes have a ratio of one-two-four, and means simultaneously to restore the multivibrators to their initial state of conduction.

2. A code translator or converter comprising a single bank of multivibrators, each multivibrator having an initial state of conduction, a multigrid tube associated with each multivibrator, means whereby each multivibrator biases its associated multigrid tube to cutoff, a code unit channel for each multivibrator to supply code unit information simultaneously to said multivibrators, each channel having means to repeat a code unit signal from the channel input to the multivibrator, means to delay operation of said code unit signal repeating means whereby to cause all of said code unit signal repeating means to operate simultaneously, means to bias one of the grids of said multigrid tubes by voltages such that the plate currents of these tubes have a ratio of one-two-four, and means simultaneously to restore the multivibrators to their initial state of conduction.

3. A code translator or converter comprising a single bank of multivibrators, each multivibrator having an initial state of conduction, a code unit channel for each multivibrator to supply code unit information simultaneously to said multivibrators, each code unit channel comprising selective filter, a signal demodulator coupled to said filter, a multigrid tube, means for coupling a grid of said multigrid tube to said signal demodulator, means responsive to code unit signals in all of said channels to provide a delay signal, means to couple said delay signal to another grid of said multigrid tube, and means simultaneously to restore the multivibrators to their initial state of conduction.

4. A code translator or converter comprising a single bank of multivibrators, each multivibrator comprising two tubes, one of which is normally in a state of conduction, a multigrid tube associated with each multivibrator, means to couple the normally conductive tube of each multivibrator to a grid of said multigrid tube to bias the tube to cutoff, a code unit channel for each multivibrator to supply code unit information to said multivibrators, means in each channel to cause said channels to transmit signals simultaneously, means to bias one of the grids of said multigrid tubes by voltages such that the plate currents of these tubes have a ratio of one-two-four, and means simultaneously to restore the multivibrators to their initial state of conduction.

5. A code translator or converter comprising a single bank of multivibrators, each multivibrator comprising two tubes, one of which is normally in a state of conduction, a multigrid tube associated with each multivibrator, means to couple the normally conductive tube of each multivibrator to a grid of said multigrid tube to bias the tube to cutoff, a code unit channel for each multivibrator to supply code unit information to said multivibrators, means in each channel to cause said channels to transmit signals simultaneously, means to bias one of the grids of said multigrid tubes by voltages such that the plate currents of these tubes have a ratio of one-two-four, and delay line means simultaneously to restore said multivibrators to their initial state of conduction.

6. A code translator or converter comprising a single bank of multivibrators, each multivibrator comprising two tubes, one of which is normally in a state of conduction, a multigrid tube associated with each multivibrator, means to couple the normally conductive tube of each multivibrator to a grid of said multigrid tube to bias the tube to cutoff, a code unit channel for each multivibrator to supply code unit information to said multivibrators, gating means in each of said code unit channels, means to bias one of the grids of said multigrid tubes by voltages such that the plate currents of these tubes have a ratio of one-two-four, a differentiating circuit, means to supply code unit information from said code unit channels to said differentiating circuit, delay means to provide differentiated code unit information from said differentiating circuit to each of said gating means in said code unit channels to cause said channels to transmit code unit information simultaneously, and means to provide differentiated code unit information from said differentiating circuit to said multivibrators simultaneously to restore said multivibrators to their initial state of conduction.

7. A code translator or converter comprising a single bank of multivibrators, each multivibrator comprising two tubes, one of which is normally in a state of conduction, a multigrid tube associated with each multivibrator, means to couple the normally conductive tube of each multivibrator to a grid of said multigrid tube to bias the tube to cutoff, a code unit channel for each multivibrator to supply code unit information to said multivibrators, said code unit channels each having a signal limiter therein, gating means in each of said code unit channels, means to bias one of the grids of said multigrid tubes by voltages such that the plate currents of these tubes have a ratio of one-two-four, a differentiating circuit, means to supply code unit information from said code unit channels to said differentiating circuit, delay means to provide differentiated code unit information from said differentiating circuit to each of said gating means in said code unit channels to cause said channels to transmit code unit information simultaneously, and means to provide differentiated code unit information from said differentiating circuit to said multivibrators simultaneously to restore said multivibrators to their initial state of conduction.

References Cited in the file of this patent

UNITED STATES PATENTS

| | | |
|---|---|---|
| 2,596,199 | Bennett | May 13, 1952 |
| 2,738,504 | Gray | Mar. 13, 1956 |